United States Patent
Ohmori et al.

(10) Patent No.: US 10,749,187 B2
(45) Date of Patent: Aug. 18, 2020

(54) CATHODE MATERIAL AND FUEL CELL

(71) Applicant: NGK INSULATORS, LTD., Nagoya-shi, Aichi (JP)

(72) Inventors: Makoto Ohmori, Nagoya (JP); Ayano Kobayashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/233,477

(22) Filed: Dec. 27, 2018

(65) Prior Publication Data

US 2019/0157687 A1 May 23, 2019
US 2020/0044260 A9 Feb. 6, 2020

Related U.S. Application Data

(63) Continuation of application No. 14/819,572, filed on Aug. 6, 2015, now Pat. No. 10,312,525, which is a (Continued)

(30) Foreign Application Priority Data

Apr. 12, 2013 (JP) .................................. 2013-084154

(51) Int. Cl.
*H01M 4/90* (2006.01)
*C04B 35/01* (2006.01)
(Continued)

(52) U.S. Cl.
CPC .......... *H01M 4/9033* (2013.01); *C04B 35/01* (2013.01); *C04B 35/2641* (2013.01); *H01M 4/8652* (2013.01); *H01M 8/1213* (2013.01); *H01M 8/1246* (2013.01); *C04B 2235/3213* (2013.01); *C04B 2235/3224* (2013.01); *C04B 2235/3227* (2013.01); *C04B 2235/3272* (2013.01);
(Continued)

(58) Field of Classification Search
CPC .................................................. H01M 8/1246
See application file for complete search history.

(56) References Cited

U.S. PATENT DOCUMENTS

2006/0197264 A1   9/2006   Cutler et al.
2008/0118635 A1   5/2008   Larsen
(Continued)

FOREIGN PATENT DOCUMENTS

EP   2276094 A1   1/2011
JP   7-267748 A   10/1995
(Continued)

OTHER PUBLICATIONS

The Communication pursuant to Article 94 (3) EPC for the corresponding European application No. 14782655.6 dated Feb. 23, 2018.
(Continued)

*Primary Examiner* — Stephan J Essex
(74) *Attorney, Agent, or Firm* — Global IP Counselors, LLP

(57) ABSTRACT

A cathode material used in an anode and a cathode contains $(Co, Fe)_3O_4$ and a perovskite type oxide that is expressed by the general formula $ABO_3$ and includes at least one of La and Sr at the A site. A content ratio of $(Co, Fe)_3O_4$ in the cathode material is at least 0.23 wt % and no more than 8.6 wt %.

4 Claims, 8 Drawing Sheets

Related U.S. Application Data continuation of application No. PCT/JP2014/059861, filed on Apr. 3, 2014.

(51) Int. Cl.
| | |
|---|---|
| *C04B 35/26* | (2006.01) |
| *H01M 4/86* | (2006.01) |
| *H01M 8/1213* | (2016.01) |
| *H01M 8/1246* | (2016.01) |
| *H01M 8/124* | (2016.01) |

(52) U.S. Cl.
CPC ............ *C04B 2235/3274* (2013.01); *C04B 2235/3275* (2013.01); *C04B 2235/3277* (2013.01); *C04B 2235/3279* (2013.01); *C04B 2235/763* (2013.01); *C04B 2235/768* (2013.01); *C04B 2235/77* (2013.01); *C04B 2235/80* (2013.01); *C04B 2235/83* (2013.01); *H01M 4/8657* (2013.01); *H01M 2008/1293* (2013.01); *H01M 2300/0071* (2013.01)

(56) References Cited

U.S. PATENT DOCUMENTS

| | | |
|---|---|---|
| 2009/0011323 A1 | 1/2009 | Guan et al. |
| 2011/0027693 A1 | 2/2011 | Sugiura et al. |
| 2012/0270139 A1 | 10/2012 | Park et al. |

FOREIGN PATENT DOCUMENTS

| | | |
|---|---|---|
| JP | 8-236138 A | 9/1996 |
| JP | 8-259346 A | 10/1996 |
| JP | 2002-367615 A | 12/2002 |
| JP | 2006-32132 A | 2/2006 |
| JP | 2007-200693 A | 8/2007 |
| JP | 2009-16351 A | 1/2009 |
| JP | 2009-37872 A | 2/2009 |
| JP | 2010-225363 A | 10/2010 |
| JP | 2011-105582 A | 6/2011 |
| JP | 2011-150813 A | 8/2011 |
| JP | 2012-227142 A | 11/2012 |

OTHER PUBLICATIONS

The extended European search report for the corresponding European application No. 18182300.6 dated Oct. 1, 2018.
An English translation of the Written Opinion of the International Search Authority for the corresponding international application No. PCT/JP2014/059861 dated Apr. 28, 2014.
An English translation of the International Search Report for the corresponding international application No. PCT/JP2014/059861 dated Apr. 28, 2014.
The Extended European Search Report for the corresponding European application No. 14782655.6 dated Oct. 7, 2016.
Wang et al., "Sulfur Poisoning on La0.6Sr0.4Co0.2Fe0.8O3 Cathode for SOFCs," Journal of Electrochemical Society, Oct. 5, 2011, pp. B1391-B1397, vol. 158 (11), The Electrochemical Society, USA.
Kishimoto et al., "Interface reaction and cation transport behavior between perovskite oxides of La1-xSrxCoO3 and La0.8Sr0.2FeO3," Solid State Ionics, Sep. 30, 2008, pp. 1338-1342, vol. 179, Shanghai, China.

CATHODE MATERIAL AND FUEL CELL

CROSS-REFERENCE TO RELATED APPLICATIONS

This application is a divisional application of U.S. patent application Ser. No. 14/819,572 filed on Aug. 6, 2015, which is a continuation application of International Application No. PCT/JP2014/059861, filed Apr. 3, 2014, which claims priority to Japanese Application No. 2013-084154, filed in Japan on Apr. 12, 2013, the contents of each of which is hereby incorporated herein by reference.

BACKGROUND

Field of the Invention

The present invention relates to a cathode material and a fuel cell.

Background Information

In recent years, fuel cell batteries have attracted attention in light of effective use of energy resources and environmental problems. A fuel cell includes a fuel battery cell and an interconnector. A fuel cell generally includes an anode, a cathode and a solid electrolyte layer that is disposed between the anode and the cathode.

A widely known configuration for the raw material of the cathode is a perovskite type oxide such as LSCF. (For example, reference is made to Japanese Patent Application Laid-Open No. 2006-32132).

SUMMARY

However, repetitive use of the fuel cell for power generation may lead to power reduction. The present inventors have gained new insight that one of the causes of power reduction resides in the deterioration of the cathode, and that the deterioration of the cathode is related to the proportion of $(Co, Fe)_3O_4$ that is found in the cathode.

The present invention is proposed based on the above new insight and has the purpose of providing a fuel cell and a cathode material that enhances durability.

A fuel cell according to the present invention includes an anode, a cathode that includes a main phase configured with a perovskite type oxide and a secondary phase configured with $(Co, Fe)_3O_4$, and a solid electrolyte layer that is disposed between the anode and the cathode. The occupied area ratio of the secondary phase in a cross section of the cathode is no more than 9.5%.

The present invention provides a fuel cell and a cathode material that enhances durability.

BRIEF DESCRIPTION OF THE DRAWINGS

Referring now to the attached drawings which form a part of this original disclosure.

DETAILED DESCRIPTION OF EMBODIMENTS

Figure 1:
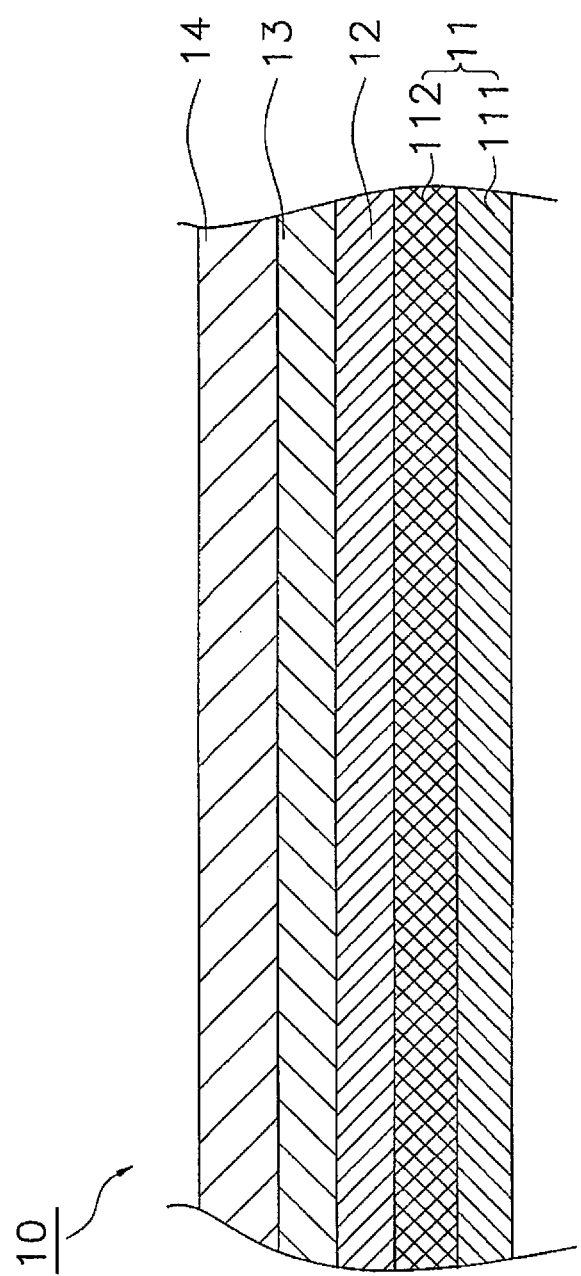
FIG. 1 is a cross sectional view illustrating the configuration of a fuel cell.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, a solid oxide fuel cell (SOFC) will be described as an example of a fuel cell. Although the following description relates to a flat-tubular type fuel cell, the invention is not limited in this regard, and may also find application in relation to a segmented-in-series fuel cell.

1. First Embodiment

Configuration of Fuel Cell 10

The configuration of a fuel cell (abbreviated below to "cell") 10 will be described making reference to the figures. FIG. 1 is a cross sectional view of the configuration of the cell 10.

The cell 10 is a thin plate body configured using a ceramic material. The thickness of the cell 10 is for example 300 micrometers to 3 mm, and the diameter of the cell 10 is 5 mm to 50 mm. A plurality of cells 10 is connected in series by interconnectors to form a fuel cell.

The cell 10 includes an anode 11, a solid electrolyte layer 12, a barrier layer 13 and a cathode 14.

The anode 11 has the function of an anode of the cell 10. The anode 11 as illustrated in FIG. 1 is configured with an anode current collecting layer 111 and an anode active layer 112.

The anode current collecting layer 111 may be configured as a porous tabular fired body including a transition metal and an oxygen ion conductive material. The anode current collecting layer 111 for example may include nickel oxide (NiO) and/or nickel (Ni) and yttria-stabilized zirconia (3YSZ, 8YSZ, 10YSZ, or the like). The thickness of the anode current collecting layer 111 may be 0.2 mm to 5.0 mm. The thickness of the anode current collecting layer 111 may be the largest of each component member of the cell 10 when the anode current collecting layer 111 functions as a support substrate. The volume ratio of Ni and/or NiO in the anode current collecting layer 111 may be 35 volume % to 65 volume %, and the volume ratio of YSZ may be 35 volume % to 65 volume %. The anode current collecting layer 111 may include yttria $(Y_2O_3)$ in substitution for YSZ.

The anode active layer 112 is disposed between the anode current collecting layer 111 and the solid electrolyte layer 12. The anode active layer 112 is configured as a porous tabular fired body including a transition metal and an oxygen ion conductive material. The anode active layer 112 for example may include NiO and/or Ni and yttria-stabilized zirconia in the same manner as the anode current collecting layer 111. The thickness of the anode active layer 112 may be 5.0 micrometers to 30 micrometers. The volume ratio of Ni and/or NiO in the anode active layer 112 may be 25 volume % to 50 volume % using an Ni conversion, and the volume ratio of YSZ may be 50 volume % to 75 volume %. In this manner, the content ratio of YSZ in the anode active layer 112 may be greater than the anode current collecting layer 111. The anode active layer 112 may include a zirconia based material such as scandia-stabilized zirconia (ScSZ) in substitution for YSZ.

The solid electrolyte layer 12 is disposed between the anode 11 and the barrier layer 13. The solid electrolyte layer 12 has the function of enabling transmission of oxygen ions produced by the cathode 14. The solid electrolyte layer 12 includes zirconium (Zr). The solid electrolyte layer 12 may include Zr as zirconia ($ZrO_2$). The solid electrolyte layer 12 may include $ZrO_2$ as a main component. In addition to ZrO2, the solid electrolyte layer 12 may include an additive such as $Y_2O_3$ and/or $Sc_2O_3$. These additives may function as a stabilizer. In the solid electrolyte layer 12, the stabilizer may have a mol composition ratio with respect to the stabilizer $ZrO_2$ (stabilizer: $ZrO_2$) of 3:97~20:80. In other words, the material used in the solid electrolyte layer 12 may include zirconia-based materials such as ScSZ and yttria-stabilized zirconia such as 3YSZ, 8YSZ, and 10YSZ, or the like. The thickness of the solid electrolyte layer 12 may be 3 micrometers to 30 micrometers.

The barrier layer 13 is disposed between the solid electrolyte layer 12 and the cathode 14. The barrier layer 13 has the function of suppressing formation of a high resistive layer between the solid electrolyte layer 12 and the cathode 14. The material used in the barrier layer 13 includes cerium (Ce) and a ceria-based material including Ce in which rare earth metal oxide is entered into solid solution. More specifically, the ceria-based material includes GDC ((Ce, Gd)$O_2$: gadolinium doped ceria), SDC ((Ce, Sm)$O_2$: samarium doped ceria), or the like. The thickness of the barrier layer 13 may be 3 micrometers to 20 micrometers.

The cathode 14 is disposed on the barrier layer 13. The cathode 14 functions as the cathode of the cell 10. The thickness of the cathode 14 may be 2 micrometers to 100 micrometers.

The cathode 14 has a main component being a perovskite type oxide expressed by the general formula $ABO_3$ and including at least one of La and Sr at the A site. This type of perovskite type oxide preferably includes a configuration of a perovskite type complex oxide that contains lanthanum and SSC (samarium strontium cobaltite: (Sm, Sr) $CoO_3$) that does not contain lanthanum. However, there is no limitation in this regard. A perovskite type complex oxide that contains lanthanum includes LSCF (lanthanum strontium cobalt ferrite: (La, Sr)(Co, Fe)$O_3$), LSF (lanthanum strontium ferrite: (La, Sr) $FeO_3$), LSC (lanthanum strontium cobaltite: (La, Sr)CoO3) and LNF (lanthanum nickel ferrite: (La (Ni, Fe)$O_3$). The cathode 14 may not contain Co (cobalt). The density of the main phase configured by a perovskite type oxide may be 5.5 $g/cm^3$~8.5 $g/cm^3$.

The occupied area ratio of the main phase in a cross section of the cathode 14 may be at least 87.5% to no more than 99.75%. The method of calculating the occupied area ratio will be described below.

The cathode 14 includes a secondary phase that is configured with (Co, Fe)$_3O_4$ in a spinel crystal structure. (Co, Fe)$_3O_4$ includes $Co_2FeO_4$, $Co_{1.5}Fe_{1.5}O_4$ and $CoFe_2O_4$. The density of the secondary phase may be configured as 5.2 $g/cm^3$~6.2 $g/cm^3$. The density of the secondary phase may be smaller than the density of the main phase.

The occupied area ratio of the secondary phase in the cross section of the cathode 14 is no more than 9.5%. In this manner, since the inactive region in the interior of the cathode is reduced, a decrease in the initial output can be suppressed and progressive deterioration of the cathode resulting from a reaction between the secondary phase and the main phase during current flow can be suppressed. As a result, the durability of the cathode 14 can be enhanced.

The occupied area ratio of the secondary phase is preferably at least 0.25%. In this manner, the porous framework structure can be strengthened as a result of the improvement to the sintering characteristics of the cathode 14 that result from suitable introduction of the secondary phase. Consequently, microstructural changes in the cathode 14 during current flow can be suppressed and the durability of the cathode 14 can be further enhanced.

The average value of the equivalent circle diameter of the particles comprising the secondary phase is preferably at least 0.05 micrometers to no more than 0.5 micrometers. The deterioration rate of the cathode 14 can be further reduced as a result of controlling the average value of the equivalent circle diameter of the secondary phase to this range. The average value of the equivalent circle diameter is the arithmetic mean value of the diameter of a circle having the same surface area as the particles comprising the secondary phase.

The cathode 14 may include a third phase that is configured by $Co_3O_4$ (tricobalt tetroxide) or CoO (cobalt oxide). The occupied area ratio of the third phase in the cross section of the cathode 14 is preferably less than 3.0%. Furthermore, in addition to the secondary phase and the third phase, the cathode 14 may include an oxide of component element of the main phase.

Method of Calculation of Occupied Area Ratio

Next, the method of calculating the occupied area ratio of the secondary phase will be described making reference to FIG. 2 to FIG. 4.

1. SEM Image

Figure 2:
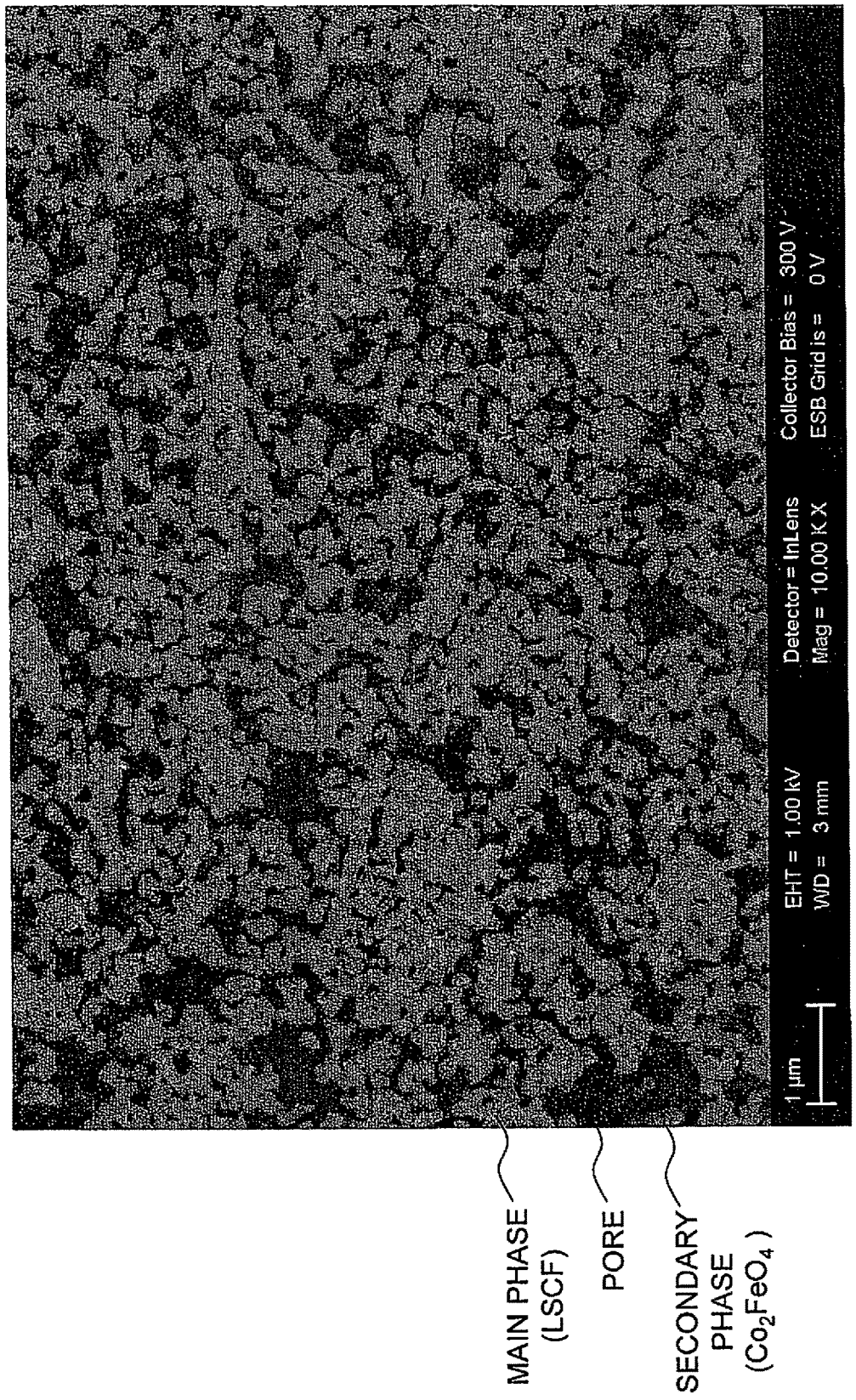
FIG. 2 illustrates an example of a SEM image of a cross section of a cathode.

FIG. 2 is an SEM image illustrating the cross section of the cathode 14 enlarged with a magnification of 10,000 times by a field emission scanning electron microscope (FE-SEM) using an in-lens secondary electron detector. FIG. 2 illustrates the cross section of the cathode 14 that contains a main component of LSCF ($La_{0.6}Sr_{0.4}$)($Co_{0.2}Fe_{0.8}$)$O_3$). The cross section of the cathode 14 is preprocessed by polishing with precision machinery, and then ion milling processing is performed using an IM4000 manufactured by Hitachi High-Technologies Corporation. The SEM image in FIG. 2 is obtained by an FE-SEM (model: ULTRA55) manufactured by Zeiss AG (Germany) with a working distance setting of 3 mm, and an acceleration voltage of 1 kV.

In the SEM image in FIG. 2, the contrast of the pores, the main phase (LSCF) and the secondary phase ((Co, Fe)$_3O_4$) differs from each other. The main phase is displayed as "faint gray", the secondary phase as "dark gray" and the pores as "black". In this manner, three values assigned by the contrast can be realized by categorizing the luminosity of the image into 256 gradations. FIG. 3 is a histogram that divides the luminosity distribution in an SEM image illustrated in FIG. 2 into 256 gradations. As illustrated in FIG. 3, the luminosity of the secondary phase is detected at a low frequency from the low luminosity side of the main phase to the high luminosity side of the pores. Consequently, in FIG. 2, the secondary phase exhibits a darker contrast than the main phase and a brighter contrast than the pores.

The method of discriminating the main phase, the secondary phase and the pores is not limited to the use of a contrast based on the SEM image. For example, after acquiring an element mapping in the same field by use of SEM-EDS, the respective particles in the image are identified by illuminating and aligning the FE-SEM image that is acquired in advance by use of an in-lens secondary electron detector to thereby arrive at three accurate values.

2. Analysis of SEM Image

Figure 4:
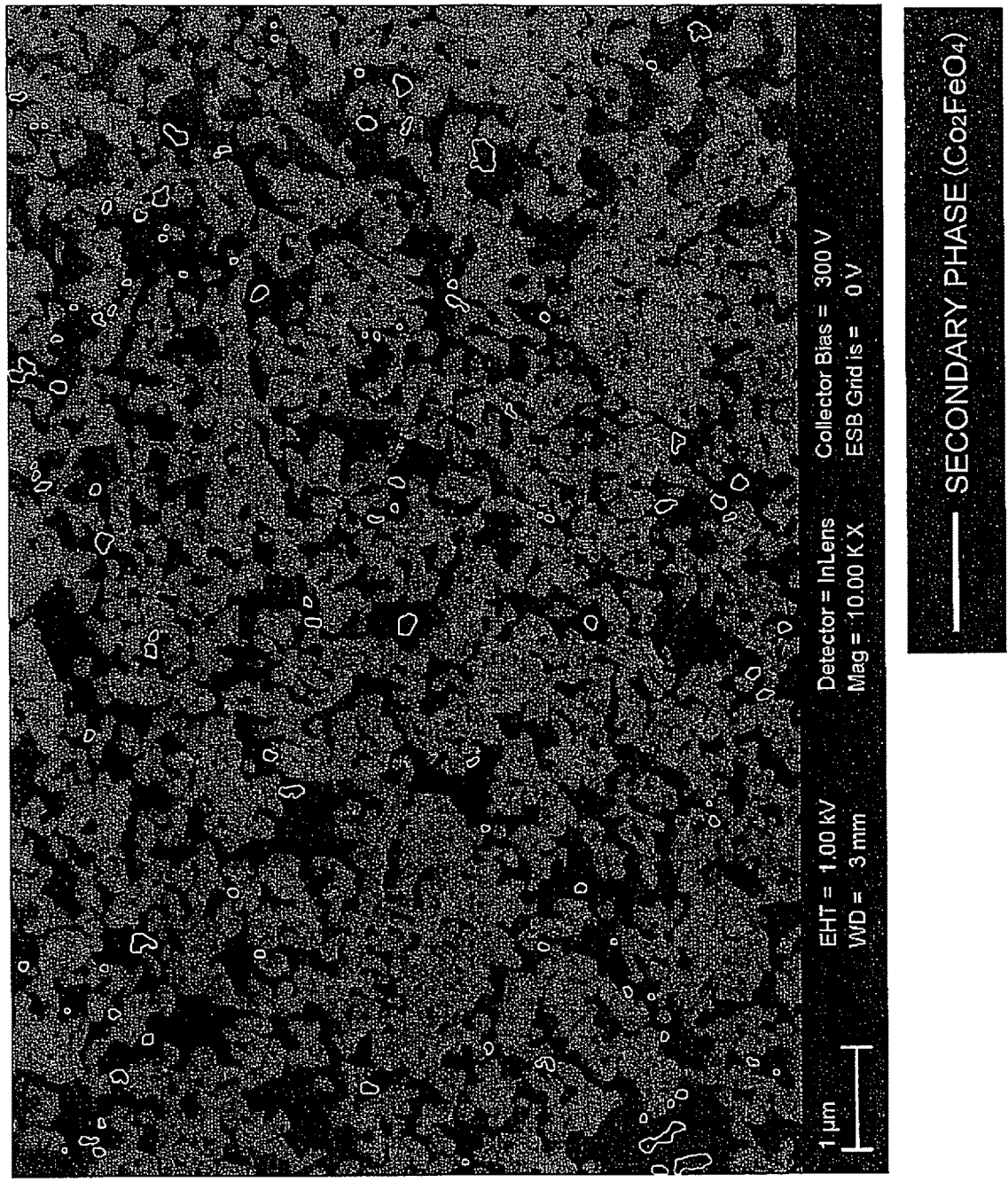
FIG. 4 illustrates an image analysis results for the SEM image illustrated in FIG. 2.

FIG. 4 illustrates the image analysis results for the SEM image illustrated in FIG. 2 using HALCON image analysis software produced by MVTec GmbH (Germany). In FIG. 4, the secondary phase is enclosed by the white solid line. It is possible to calculate the occupied area ratio of the main phase and the secondary phase based on the analysis image illustrated in FIG. 4.

Firstly, the sum total surface area of the secondary phase enclosed by the white solid line is calculated with reference to the analysis image. Next, the proportion of the sum total surface area of the secondary phase to the gross surface area of the analysis image is calculated. The proportion of the sum total surface area of the secondary phase calculated in this manner is taken to be the occupied area ratio of the secondary phase.

Cathode Material

The cathode material that configures the cathode 14 is preferably raw material mixture of $(Co, Fe)_3O_4$ and a perovskite type oxide that is expressed by the general formula $ABO_3$.

The perovskite type oxide includes LSCF, LSF, LSC, LNF, SSC, or the like. $(Co, Fe)_3O_4$ includes $Co_2FeO_4$, $Co_{1.5}Fe_{1.5}O_4$ and $CoFe_2O_4$.

The added amount of $(Co, Fe)_3O_4$ in the cathode material is no more than 8.6 wt %. In this manner, the occupied area ratio of the secondary phase $((Co, Fe)_3O_4)$ in the cross section of the cathode 14 can be controlled to no more than 9.5%. Furthermore, the added amount of $(Co, Fe)_3O_4$ in the cathode material is preferably at least 0.23 wt %. In this manner, the occupied area ratio of the secondary phase in the cross section of the cathode 14 can be controlled to be at least 0.25%.

It is further possible to perform micro adjustment to the occupied area ratio of the secondary phase by adjusting the grain size or the status of the raw material of $(Co, Fe)_3O_4$ (whether it is in the form of an hydroxide or a salt).

Furthermore, since the density of the raw material of $(Co, Fe)_3O_4$ is smaller than the density of the perovskite type oxide, the density of the secondary phase in the cathode 14 can be configured to be smaller than the density of the main phase.

In addition, the equivalent circle diameter of the particles comprising the secondary phase in the cathode 14 can be adjusted by adjusting the grain size of the raw material of $(Co, Fe)_3O_4$. An accurate classification that includes an upper limiting value and a lower limiting value is possible by adjusting the grain size of the raw material of $(Co, Fe)_3O_4$ by use of an air classifier.

Method of Manufacturing Cell 10

Next, an example will be described of a manufacture method for the cell 10. However, respective conditions such as the material, the particle diameter, the temperature and the method of coating as described below may be varied as required. "Green body" below denotes a state prior to firing.

Firstly, a slurry is formed by adding polyvinyl alcohol (PVA) as a binder to a mixture of NiO powder, YSZ powder, and a pore forming agent (for example, Polymethyl methacrylate (PMMA)). Next, the slurry is dried and granulated by use of a spray drier to form a powder for the anode current collecting layer. Then, the powder for the anode current collecting layer is pressed using a die press molding method to form a green body for the anode current collecting layer 111.

Then, a slurry is formed by adding polyvinyl alcohol as a binder to a mixture of NiO powder, YSZ powder, and a pore forming agent (for example, PMMA). The slurry is printed onto the green body of the anode current collecting layer 111 using a printing method to thereby form a green body for the anode active layer 112. In this manner, the green body for the anode 11 is formed.

Next, a mixture of YSZ powder, water and a binder is mixed in a ball mill for 24 hours to prepare a slurry. Then the slurry is coated on the green body for the anode active layer 112, and dried to form a green body for the solid electrolyte layer 12. In substitution for a method of coating, a method such as a tape lamination method or a printing method may be used.

Then, a mixture of GDC powder, water and a binder is mixed in a ball mill for 24 hours to prepare a slurry. Then the slurry is coated on the green body for the electrolyte layer 12, and dried to form a green body for the barrier layer 13. In substitution for a method of coating, a method such as a tape lamination method or a printing method may be used.

As described above, a laminated body configured with the green body for the anode 11, the green body for the solid electrolyte layer 12 and the green body for the barrier layer 13 can be formed.

Then the laminated body formed from the green bodies is co-sintered for 2 to 20 hours at 1300 to 1600 degrees C. to form a co-fired body formed from a dense barrier layer 13 and solid electrolyte layer 12 and an anode 11 that is configured with the anode current collecting layer 111 and the anode active layer 112.

Then, the above cathode material, water and a binder are mixed in a ball mill for 24 hours to prepare a slurry.

The slurry is coated on the barrier layer 13 of the co-fired body, and dried, and then fired for one hour in an electric furnace ($O_2$ containing atmosphere, 1000 degrees C.) to form the porous cathode 14 on the barrier layer 13. In the above manner, the cell 10 is completed.

2. Second Embodiment

Configuration of Fuel Cell 20

Figure 5:
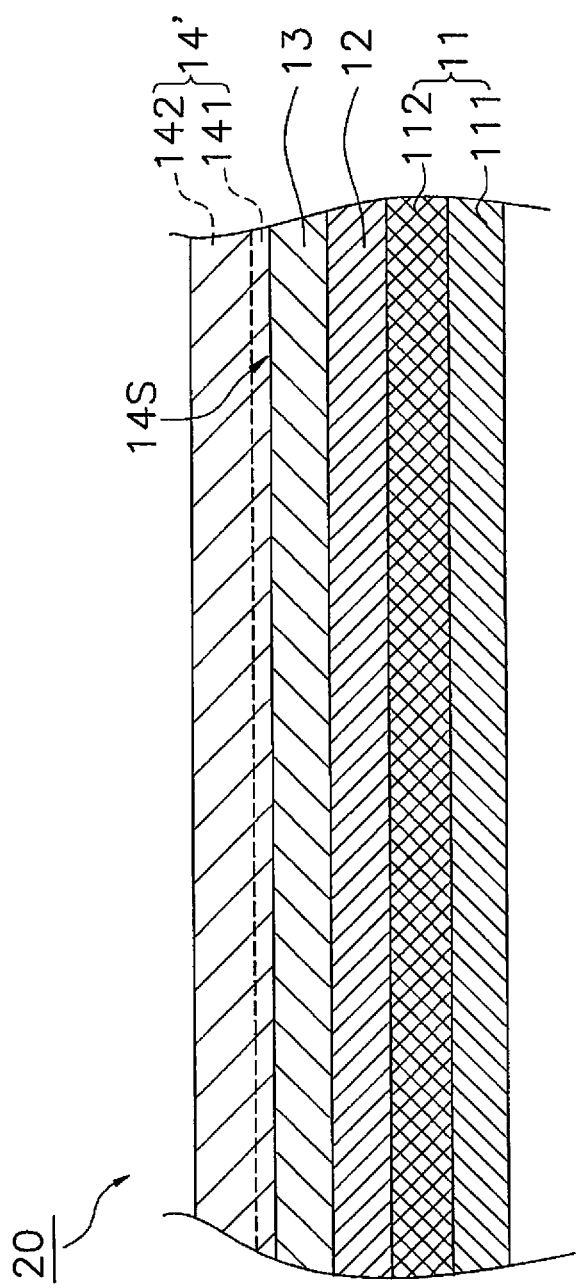
FIG. 5 illustrates a cross sectional view illustrating another configuration of a fuel cell.

The configuration of a fuel cell 20 according to a second embodiment will be described making reference to the figures. FIG. 5 is a cross sectional view of the configuration of the cell 20. The point of difference between the cell 10 according to the first embodiment and the cell 20 according to the second embodiment resides in the feature that the occupied area ratio of the secondary phase is controlled only in relation to the region near the solid electrolyte layer of a cathode 14. The following description will focus mainly on the point of difference.

As illustrated in FIG. 5, the cathode 14' includes a first region 141 and a second region 142.

The first region 141 is a region within 3 micrometers from the surface 14S near to the solid electrolyte layer 12. The first region 141 is an example of the "solid electrolyte layer-side region". The cell 20 according to the present embodiment is configured by interposing the barrier layer 13 between the solid electrolyte layer 12 and the cathode 14' so that the first region 141 is in contact with the barrier layer 13. However, when the cell 20 is configured without provision of the barrier layer 13, the first region 141 is in contact with the solid electrolyte layer 12.

The first region 141 includes a main phase configured with a perovskite type oxide that is expressed by the general formula $ABO_3$ and includes at least one of Sr and La at the A site. The occupied area ratio of the main phase in the cross section of the first region 141 may be at least 87.5% to no more than 99.75%.

The first region 141 includes a secondary phase that is configured with $(Co, Fe)_3O_4$ in a spinel crystal structure. The occupied area ratio of the secondary phase in a cross section of the first region 141 is no more than 9.5%. In this manner, the film strength of the first region 141 can be enhanced by addition of (Co, Fe)$_3$O$_4$, and it is possible to suppress a large thermal expansion difference between the first region 141 and the barrier layer 13 or the solid electrolyte layer 12 as a result of addition of (Co, Fe)$_3$O$_4$. Consequently, it is possible to prevent delamination of the cathode 14'. The occupied area ratio of the secondary phase in the cross section of the first region 141 is preferably at least 0.25%. In this manner, since a sufficient enhancement to the film strength of the first region 141 is enabled by addition of (Co, Fe)$_3$O$_4$, enhanced suppression of delamination of the cathode 14' is enabled. The method of calculating the surface area occupied ratio of the secondary phase is the same as that described with reference to the. first embodiment.

The average value of the equivalent circle diameter of particles comprising the secondary phase is preferably at least 0.05 micrometers to no more than 0.5 micrometers in the cross section of the first region 141. The density of the secondary phase may be smaller than the density of the main phase. The first region 141 may include a third phase that is configured by Co3O$_4$ (tricobalt tetroxide) or CoO (cobalt oxide). The occupied area ratio of the third phase in a cross section of the first region 141 is preferably less than 3.0%. Furthermore, in addition to the secondary phase and the third phase, the first region 141 may include an oxide of component element of the main phase.

The cathode material described with reference to the first embodiment may be suitably used as the material of the first region 141 as described above.

The second region 142 is a region separated by at least 3 micrometers from the surface 14S near to the solid electrolyte layer 12. The second region 142 is disposed on the first region 141. The second region 142 includes a perovskite type oxide expressed by the general formula ABO$_3$ and including at least one of La and Sr at the A site. The second region 142 need not include (Co, Fe)$_3$O$_4$ in a spinel crystal structure.

The surface 14S of the cathode 14' near to the solid electrolyte layer 12 can be defined by a line of rapid change in the concentration distribution when the component density in the cross sectional surface of the cathode 14' and the solid electrolyte layer 12 is mapped. The surface 14S of the cathode 14' near to the solid electrolyte layer 12 may also be defined by a line of rapid change in the porosity in the cross sectional surface of the cathode 14' and the solid electrolyte layer 12.

Method of Manufacturing Cell 20

Next, a manufacture method for the cell 20 according to the second embodiment will be described. Since the method of manufacturing the anode 11, the solid electrolyte layer 12 and the barrier layer 13 has been described above in the first embodiment, the following description will focus mainly on the manufacturing method for the cathode 14'.

Firstly, a co-fired body is prepared from the anode 11, the solid electrolyte layer 12 and the barrier layer 13.

Then, a slurry for the first region 141 is prepared by mixing the cathode material for the first region 141 (including the main phase and the secondary phase described above), water, and a binder in a ball mill for 24 hours.

Next, the slurry for the first region is coated on the barrier layer 13 of the cofired body and dried to thereby form a green body for the first region 141.

Then, a known cathode material (for example, LSCF, or the like), water and a binder are mixed in a ball mill for 24 hours to thereby prepare the slurry for the second region.

Next, the slurry for the second region is coated on the green body for the first region 141 and dried to thereby form a green body for the second region 142.

Next, the green body for the first region 141 and the green body for the second region 142 are fired for one hour in an electric furnace (O$_2$ containing atmosphere, 1000 degrees C.) to form the cathode 14' on the barrier layer 13.

Other Embodiments

The present invention is not limited to the above embodiments and various modifications or changes are possible within a scope that does not depart from the spirit of the invention.

Figure 3:
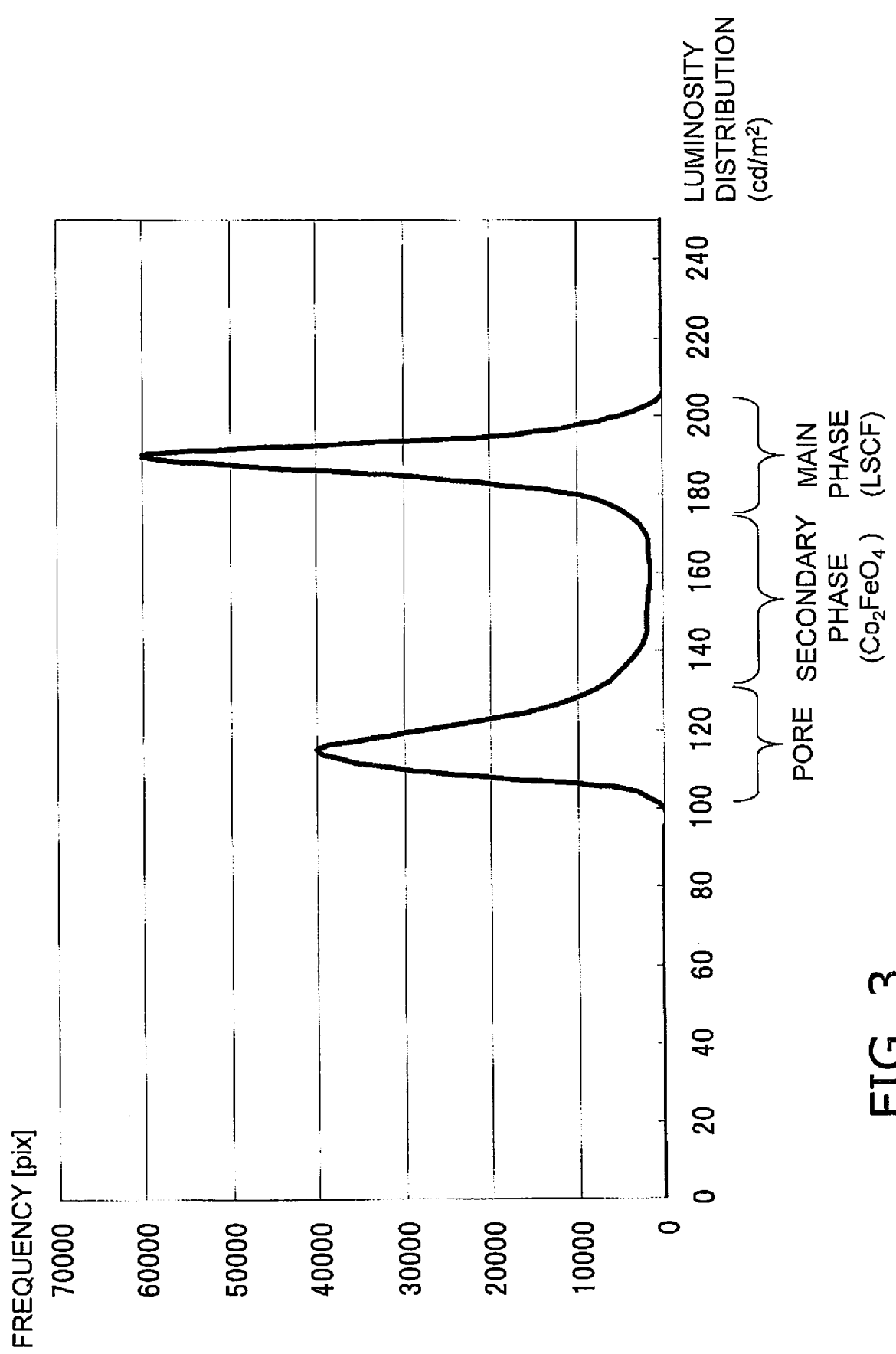
FIG. 3 illustrates a histogram that divides the luminosity distribution in the SEM image into 256 gradations.

(A) In the above embodiment, although FIG. 2 to FIG. 4 illustrate a cross sectional view in which the cathode 14 contains the main phase of LSCF, the cathode 14 just have to contain a main phase of a perovskite type oxide such as (LSC or SSC, or the like).

(B) In the above embodiment, although the cell 10 includes the anode 11, the solid electrolytic layer 12, the barrier layer 13 and the cathode 14, the invention is not thereby limited. The cell 10 may include the anode 11, the solid electrolytic layer 12 and the cathode 14, and another layer may be interposed between the anode 11, the solid electrolytic layer 12 and the cathode 14. For example, in addition to the barrier layer 13, the cell 10 may include a porous barrier layer that is interposed between the barrier layer 13 and the cathode 14.

(C) Although such a feature has not been specifically disclosed in the above embodiments, the configuration of the cell 10 may have an anode-support configuration, or a tabular, cylindrical, a flat-tubular type, segmented-in-series configuration, or the like. Furthermore, the cross section of the cell 10 may be oval, or the like.

(D) The second embodiment includes the configuration of the region within 3 micrometers from the surface 14S near to the solid electrolyte layer 12 of the cathode 14' has been denoted as "a solid electrolyte layer-side region". However, when the thickness of the cathode 14' is less than or equal to 3 micrometers, the whole of the cathode 14' may be configured as "a solid electrolyte layer-side region".

EXAMPLES

Although the examples of the fuel cell according to the present invention will be described below, the present invention is not thereby limited to the following examples.

Preparation of Samples No. 1 to No. 22

As described below, Samples No. 1 to No. 22 of an anode support cell were prepared in which the anode current collection layer is configured as a support substrate.

Firstly, a green body for an anode current collection layer (NiO:8YSZ=50:50 (Ni volume % conversion)) having a thickness of 500 micrometers was formed using a die press molding method. Then, a green body for an anode active layer (NiO:8YSZ=45:55 (Ni volume % conversion)) having a thickness of 20 micrometers was formed on the green body for the anode current collection layer using a printing method.

Then, a green body for an 8YSZ electrolyte having a thickness of 5 micrometers and a green body for a GDC barrier film having a thickness of 5 micrometers were formed in series on the green body for the anode active layer to thereby form a laminated body.

The laminated body was then co-sintered for two hours at 1400 degrees C. to obtain a co-fired body. Thereafter, a cathode having a thickness of 30 micrometers was sintered with the laminated body for 2 hours at 1000 degrees C., and thereby samples No. 1 to No. 22 were prepared in an anode-support type coin cell (φ=15 mm).

As described in Table 1, the main component of the cathode material was LSCF, LSF, and SSC. In samples No.

2, 7 and 13, $CoFe_2O_4$ was added to the cathode material as (Co, Fe)$_3$O$_4$. In samples 4, 6, 14 and 20, $Co_{1.5}Fe_{1.5}O_4$ was added to the cathode material as (Co, Fe)$_3$O$_4$. In other samples, $Co_2FeO_4$ was added to the cathode material as (Co, Fe)$_3$O$_4$.

Measurement of Occupied Area Ratio

Firstly, the cathode of each of samples No. 1 to No. 22 was polished with precision machinery, and then ion milling processing was performed using an IM4000 manufactured by Hitachi High-Technologies Corporation.

An SEM image of the cross section of the cathode enlarged with a magnification of 10,000 times by the FE-SEM using the in-lens secondary electron detector was acquired (reference is made to FIG. 2).

Then, an analysis image was acquired by analyzing the SEM image for each sample using HALCON image analysis software produced by MVTec GmbH (Germany) (reference is made to FIG. 3).

Then, the occupied area ratio of the secondary phase configured with (Co, Fe)$_3$O$_4$ was calculated with reference to the analysis image. The calculation results for the occupied area ratio of the secondary phase are shown in Table 1.

Component Analysis of Secondary Phase

Next, component analysis of the secondary phase in samples No. 1 to No. 22 was performed to identify the component material of the secondary phase in each sample.

Figure 6:
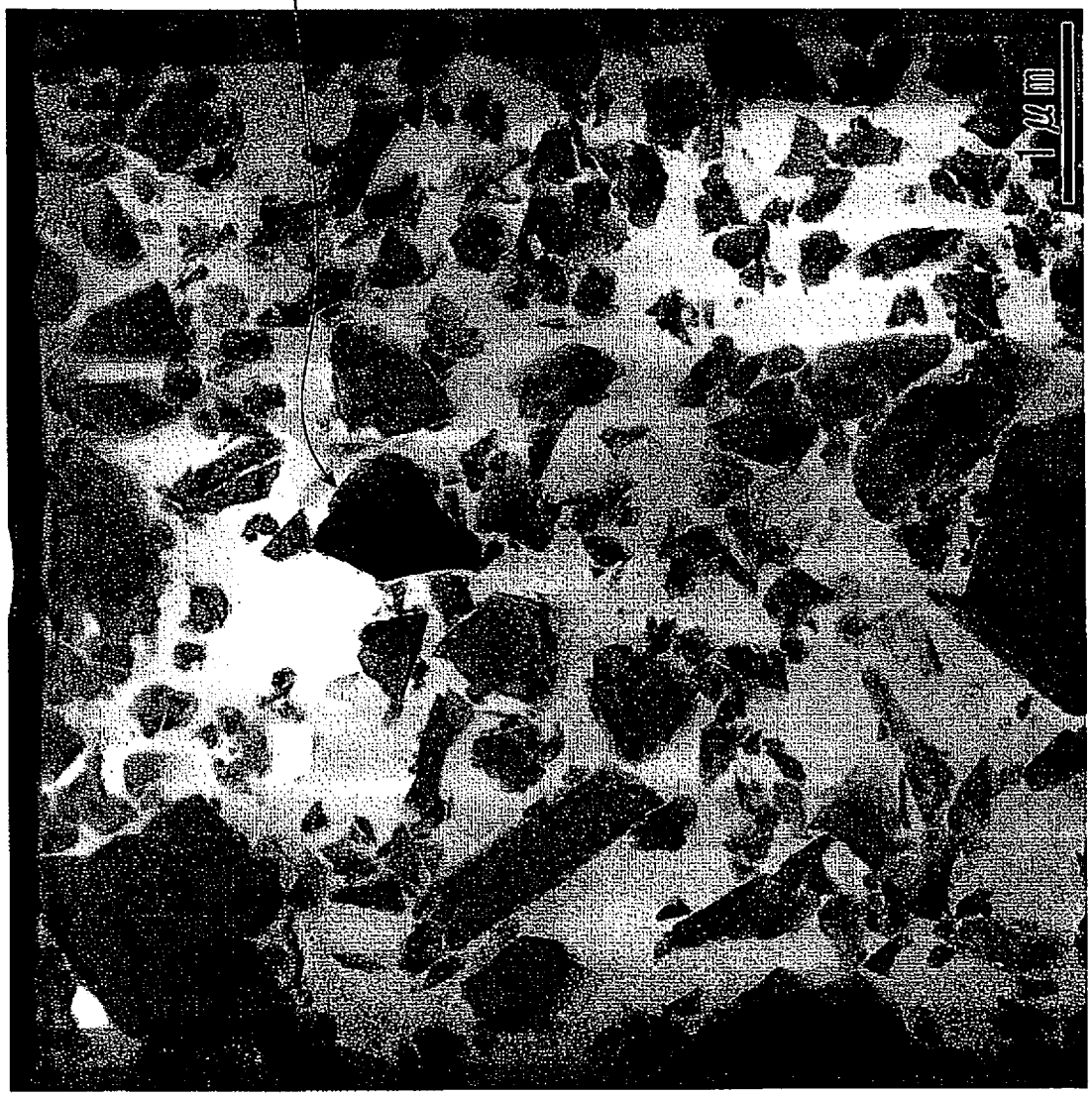
FIG. 6 illustrates an example of a TEM image of a cathode cross section.

Firstly, a TEM image of the cathode cross section was acquired by use of a transmission electron microscope (TEM). FIG. 6 illustrates an example of a TEM image of a cathode cross section, and illustrates a secondary phase configured with $Co_2FeO_4$. The position of the secondary phase was confirmed with reference to the TEM image.

Figure 7:
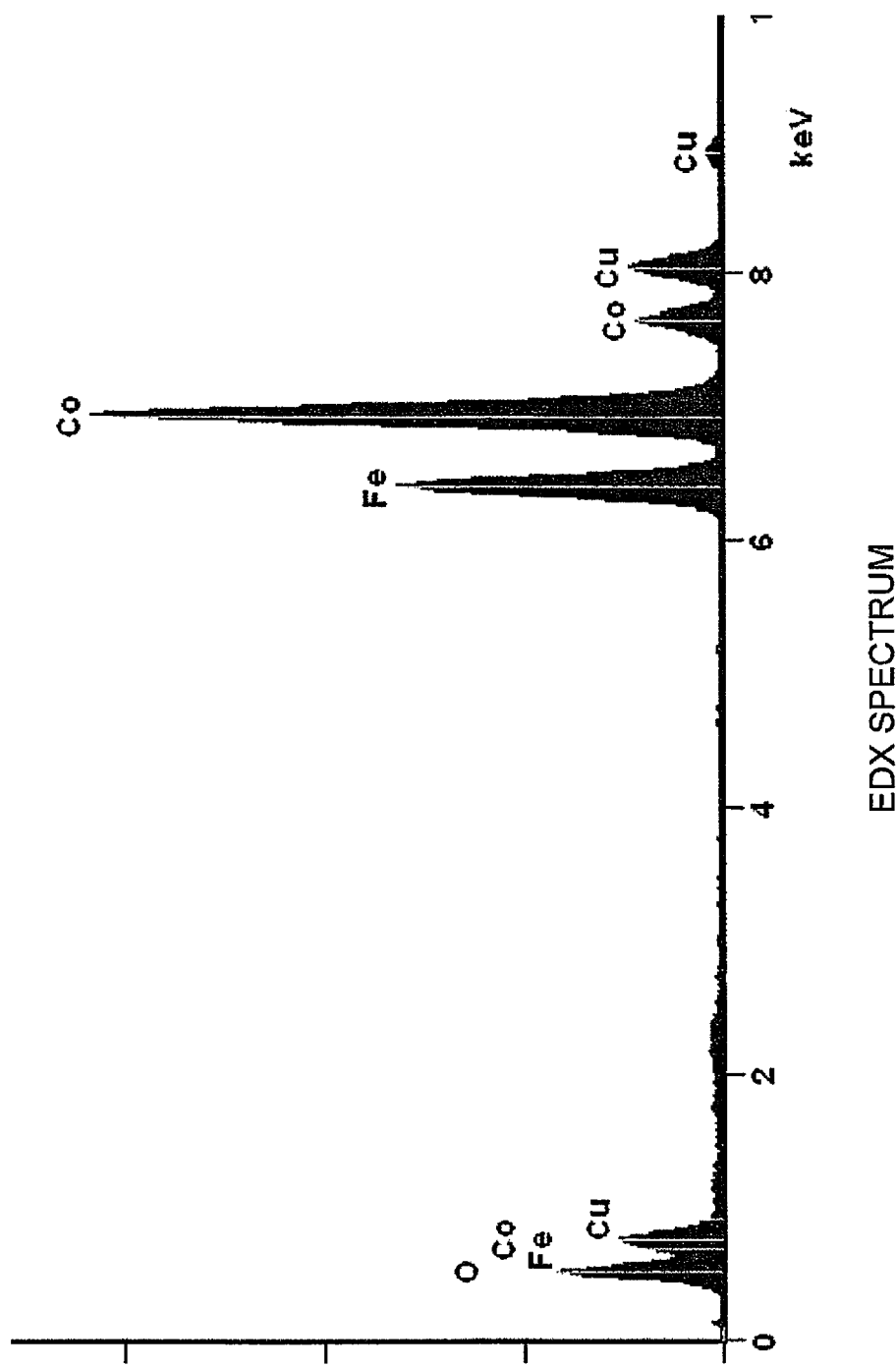
FIG. 7 illustrates a graph showing an example of an EDX spectrum of a secondary phase.

Next, energy dispersive x-ray spectroscopy (EDX) was used to analyze the elements of the particles comprising secondary phase. FIG. 7 is a graph illustrating an example of an EDX spectrum of the secondary phase configured with $Co_2FeO_4$. Semi-quantitative analysis of the EDX spectrum enables an inference regarding the component materials of the secondary phase. In FIG. 7, although Cu is detected, this is due to the component for the sample holder in the analytic device and not a component material of the secondary phase.

Figure 8:
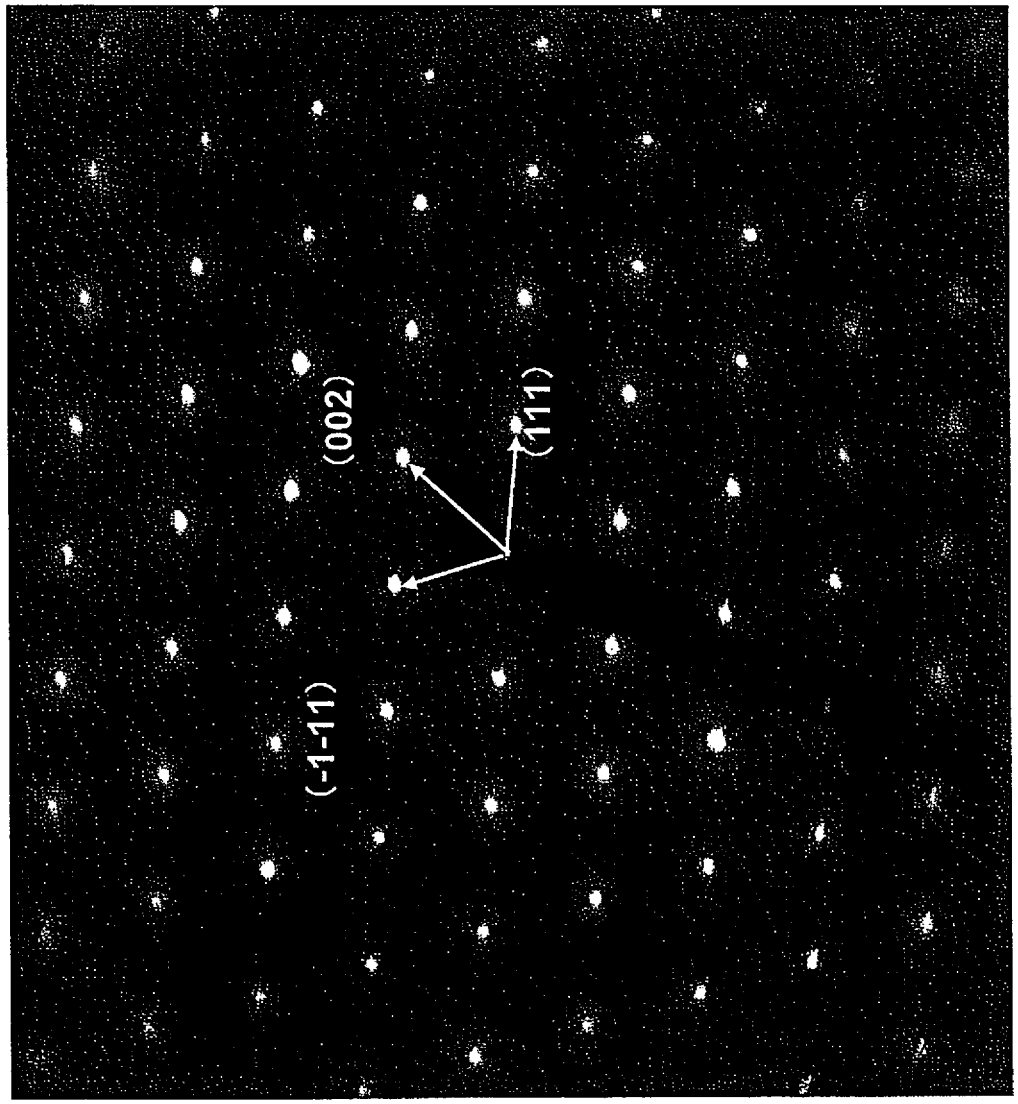
FIG. 8 illustrates an example of an SAED image of the secondary phase.

Next, the crystalline structure (lattice constant, lattice configuration, crystal orientation) of the component particles of the secondary phase was analyzed by selected area electron diffraction (SAED). FIG. 8 illustrates an example of a SAED image of a secondary phase configured with $Co_2FeO_4$. The component materials of the secondary phase can be inferred by analyzing the lattice constant, the lattice configuration, and the crystal orientation based on the SAED image.

As a result of the analysis of the secondary phase of each sample using the above methods, samples No. 2, 7 and 13 were identified as $CoFe_2O_4$, samples No. 4, 6, 14 and 20 were identified as $Co_{1.5}Fe_{1.5}O_4$, and other samples were identified as $Co_2FeO_4$.

Durability Testing

Samples No. 1 to No. 20 were heated to 750 degrees C. while supplying nitrogen gas to the anode side and air to the cathode side. When 750 degrees C. is reached, a reduction process was performed for three hours while supplying hydrogen gas to the anode.

Thereafter, the voltage depression rate per 1000 hours was measured in relation to samples NO. 1 to No. 22 as a deterioration rate. The output density at a rated current density of 0.2 A/cm$^2$ and at a temperature of 750 degrees C. was used. The measurement results are summarized in Table 1. A state of low deterioration is evaluated for those samples in Table 1 in which the deterioration rate was less than or equal to 1.5%.

After the durability testing above, the presence or absence of cracks in the interior of the cathode was observed by observation with an electron microscope of the cross section of the cathode. The measurement results are summarized in Table 1.

TABLE 1

| Sample | Main Component of Cathode Material | Type of (Co,Fe)$_3$O$_4$ comprising Secondary Phase | Content Ratio (wt %) of (Co,Fe)$_3$O$_4$ in Cathode Material | Occupied Area Ratio (%) of (Co,Fe)$_3$O$_4$ in Cathode | Equivalent Circle Diameter (micrometers) of Particles comprising Secondary Layer | Deterioration Rate (%) | Presence or Absence of Microcracks | Evaluation |
|---|---|---|---|---|---|---|---|---|
| No. 1 | LSCF | Co$_2$FeO$_4$ | 0.14 | 0.16 | 0.33 | 0.51 | Yes (minute) | ○ |
| No. 2 | LSCF | Co$_2$FeO$_4$ | 0.17 | 0.19 | 0.08 | 0.26 | Yes (minute) | ○ |
| No. 3 | LSCF | Co$_2$FeO$_4$ | 0.23 | 0.25 | 0.05 | 0.32 | No | ◎ |
| No. 4 | LSCF | Co$_{1.5}$Fe$_{1.5}$O$_4$ | 0.47 | 0.52 | 0.34 | 0.44 | No | ◎ |
| No. 5 | LSCF | Co$_2$FeO$_4$ | 0.79 | 0.88 | 0.18 | 0.38 | No | ◎ |
| No. 6 | LSCF | Co$_{1.5}$Fe$_{1.5}$O$_4$ | 2.3 | 2.6 | 0.25 | 0.66 | No | ◎ |
| No. 7 | LSCF | CoFe$_2$O$_4$ | 3.8 | 4.2 | 0.15 | 0.83 | No | ◎ |
| No. 8 | LSCF | Co$_2$FeO$_4$ | 6.4 | 7.1 | 0.50 | 1.2 | No | ◎ |
| No. 9 | LSCF | Co$_2$FeO$_4$ | 8.6 | 9.5 | 0.62 | 1.5 | No | ◎ |
| No. 10 | LSCF | Co$_2$FeO$_4$ | 9.3 | 10.3 | 0.88 | 2.8 | No | X |
| No. 11 | LSF | Co$_2$FeO$_4$ | 0.14 | 0.15 | 0.31 | 0.35 | Yes (minute) | ○ |
| No. 12 | LSF | Co$_2$FeO$_4$ | 0.32 | 0.35 | 0.14 | 0.52 | No | ◎ |
| No. 13 | LSF | Co$_2$FeO$_4$ | 0.59 | 0.66 | 0.08 | 0.45 | No | ◎ |
| No. 14 | LSF | Co$_{1.5}$Fe$_{1.5}$O$_4$ | 1.4 | 1.5 | 0.39 | 0.76 | No | ◎ |
| No. 15 | LSF | Co$_2$FeO$_4$ | 3.2 | 3.6 | 0.50 | 1.2 | No | ◎ |
| No. 16 | LSF | Co$_2$FeO$_4$ | 5.1 | 5.6 | 0.42 | 0.91 | No | ◎ |
| No. 17 | LSF | Co$_2$FeO$_4$ | 10 | 11.1 | 0.93 | 2.5 | No | X |
| No. 18 | SSC | Co$_2$FeO$_4$ | 0.19 | 0.21 | 0.28 | 0.45 | Yes (minute) | ○ |
| No. 19 | SSC | Co$_2$FeO$_4$ | 0.30 | 0.33 | 0.35 | 0.65 | No | ◎ |
| No. 20 | SSC | Co$_{1.5}$Fe$_{1.5}$O$_4$ | 2.3 | 2.5 | 0.27 | 0.33 | No | ◎ |
| No. 21 | SSC | Co$_2$FeO$_4$ | 4.1 | 4.5 | 0.48 | 0.85 | No | ◎ |
| No. 22 | SSC | Co$_2$FeO$_4$ | 9.5 | 10.6 | 0.85 | 2.2 | No | X |

As illustrated in Table 1, the deterioration rate of the cathode was reduced to no more than 1.5% in those samples in which the added amount of $(Co, Fe)_3O_4$ to the cathode material is less than or equal to 8.6 wt %. This is due to the fact that the occupied area ratio of the secondary phase was suppressed to no more than 9.5% by limiting the added amount of $(Co, Fe)_3O_4$ to the cathode material. More specifically, the inactive region in the interior of the cathode is reduced by suitably reducing the secondary phase. Therefore the progressive deterioration of the cathode was suppressed as a result of suppressing a reaction of the main phase with the secondary phase during current flow.

As illustrated in Table 1, those samples in which the added amount of $(Co, Fe)_3O_4$ to the cathode material was at least 0.25 wt % exhibited suppression of the production of cracks in the interior of the cathode. This feature is due to the fact that the occupied area ratio of the secondary phase was maintained at more than or equal to 0.25% by maintaining the added amount of $(Co, Fe)_3O_4$ to the cathode material. More specifically, the porous framework structure was strengthened as a result of an improvement to sintering characteristics of the cathode by suitable inclusion of the secondary phase.

As illustrated in Table 1, the deterioration rate is suppressed to no more than 1.2% in samples exhibiting an average value of the equivalent circle diameter in the secondary phase of at least 0.05 micrometers to no more than 0.5 micrometers.

Preparation of Samples No. 23 to No. 44

Samples No. 23 to No. 44 were prepared as described below.

Firstly, a green body for an anode current collection layer (NiO:8YSZ=50:50 (Ni volume % conversion)) having a thickness of 500 micrometers was formed using a die press molding method. Then, a green body for an anode active layer (NiO:8YSZ=45:55 (Ni volume % conversion)) having a thickness of 20 micrometers was formed on the green body for the anode current collection layer using a printing method.

Then, a green body for an 8YSZ electrolyte having a thickness of 5 micrometers and a green body for GDC barrier film having a thickness of 5 micrometers were formed in series on the green body for the anode active layer to thereby form a laminated body.

The laminated body was then co-sintered for two hours at 1400 degrees C. to obtain a co-fired body.

Thereafter, a slurry was prepared by mixing cathode materials including a secondary phase and a main phase as described in Table 2, water and a binder in a ball mill for 24 hours.

The slurry for a first region was coated onto the co-sintered body to thereby form a green body for the first region of a cathode.

Thereafter, a slurry for the second region was prepared by mixing LSCF, water and a binder in a mill.

The slurry for the second region was coated onto the green body for the first region to thereby prepare a green body for the second region of the cathode.

Next, the green body for the first region and the green body for the second region were fired for two hours at 1000 degrees C., and thereby samples No. 23 to No. 44 were prepared in an anode-support type coin cell ($\phi$=15 mm).

Measurement of Occupied Area Ratio

Firstly, the first region of each of samples No. 23 to No. 44 was polished with precision machinery, and then ion milling processing was performed using an IM4000 manufactured by Hitachi High-Technologies Corporation.

An SEM image of the cross section of the first region enlarged with a magnification of 10,000 times by FE-SEM using an in-lens secondary electron detector was acquired.

Then, an analysis image was acquired by analyzing SEM image for each sample using HALCON image analysis software produced by MVTec GmbH (Germany).

Next, the occupied area ratio of the secondary phase configured with $(Co, Fe)_3O_4$ was calculated with reference to the analysis image. The calculation results for the occupied area ratio of the secondary phase are shown in Table 2.

Component Analysis of Secondary Phase

Next, component analysis of the secondary phase in samples No. 23 to No. 44 was performed in relation to the first region to identify the component material of the secondary phase in each sample.

Firstly, a TEM image of the cathode cross section was acquired by use of the TEM.

Then, EDX was used to analyze the elements of the particles comprising the secondary phase.

Next, the crystalline structure (lattice constant, lattice configuration and crystal orientation) of the component particles of the secondary phase was analyzed by SAED.

As a result of the analysis of the secondary phase of each sample using the above method, sample No. 29 was identified as $CoFe_2O_4$, samples No. 26, 28, 36 and 42 were identified as $Co_{1.5}Fe_{1.5}O_4$, and other samples were identified as $Co_2FeO_4$.

Heat Cycle Testing

The process cycle in which heated from ambient temperature to 750 degrees C. and fell to ambient temperature in four hours while supplying nitrogen gas to the anode side and air to the cathode side was repeated 10 times.

Thereafter, the presence or absence of delamination at the interface between the cathode and the barrier layer was confirmed by electron microscope observation of the cathode cross section for each sample. The results are summarized in Table 2.

In Table 2, the samples that are confirmed to exhibit delamination associated with a risk of an effect on the characteristic properties of the cathode are evaluated by "X", the samples that are confirmed to exhibit micro delamination not associated with a risk of an effect on the characteristic properties of the cathode are evaluated by "O", and samples not exhibiting delamination are evaluated by "⊚".

TABLE 2

| Sample | Main Component of First Region | Type of $(Co,Fe)_3O_4$ comprising Secondary Phase of First Region | Content Ratio (wt %) of $(Co,Fe)_3O_4$ in First Region Material | Occupied Area Ratio (%) of $(Co,Fe)_3O_4$ in First Region | Equivalent Circle Diameter (micrometers) of Particles comprising Secondary Layer | Presence or Absence of Interface Delamination | Evaluation |
|---|---|---|---|---|---|---|---|
| No. 23 | LSCF | $Co_2FeO_4$ | 0.14 | 0.16 | 0.33 | Yes (minute) | O |
| No. 24 | LSCF | $Co_2FeO_4$ | 0.17 | 0.19 | 0.08 | Yes (minute) | O |
| No. 25 | LSCF | $Co_2FeO_4$ | 0.23 | 0.25 | 0.05 | No | ⊚ |
| No. 26 | LSCF | $Co_{1.5}Fe_{1.5}O_4$ | 0.47 | 0.52 | 0.34 | No | ⊚ |

TABLE 2-continued

| Sample | Main Component of First Region | Type of (Co,Fe)$_3$O$_4$ comprising Secondary Phase of First Region | Content Ratio (wt %) of (Co,Fe)$_3$O$_4$ in First Region Material | Occupied Area Ratio (%) of (Co,Fe)$_3$O$_4$ in First Region | Equivalent Circle Diameter (micrometers) of Particles comprising Secondary Layer | Presence or Absence of Interface Delamination | Evaluation |
|---|---|---|---|---|---|---|---|
| No. 27 | LSCF | Co$_2$FeO$_4$ | 0.79 | 0.88 | 0.18 | No | ⊚ |
| No. 28 | LSCF | Co$_{1.5}$Fe$_{1.5}$O$_4$ | 2.3 | 2.6 | 0.25 | No | ⊚ |
| No. 29 | LSCF | CoFe$_2$O$_4$ | 3.8 | 4.2 | 0.15 | No | ⊚ |
| No. 30 | LSCF | Co$_2$FeO$_4$ | 6.4 | 7.1 | 0.50 | No | ⊚ |
| No. 31 | LSCF | Co$_2$FeO$_4$ | 8.6 | 9.5 | 0.62 | No | ⊚ |
| No. 32 | LSCF | Co$_2$FeO$_4$ | 9.3 | 10.3 | 0.88 | Yes | X |
| No. 33 | LSF | Co$_2$FeO$_4$ | 0.14 | 0.15 | 0.31 | Yes (minute) | ○ |
| No. 34 | LSF | Co$_2$FeO$_4$ | 0.32 | 0.35 | 0.14 | No | ⊚ |
| No. 35 | LSF | Co$_2$FeO$_4$ | 0.59 | 0.66 | 0.08 | No | ⊚ |
| No. 36 | LSF | Co$_{1.5}$Fe$_{1.5}$O$_4$ | 1.4 | 1.5 | 0.39 | No | ⊚ |
| No. 37 | LSF | Co$_2$FeO$_4$ | 3.2 | 3.6 | 0.50 | No | ⊚ |
| No. 38 | LSF | Co$_2$FeO$_4$ | 5.1 | 5.6 | 0.42 | No | ⊚ |
| No. 39 | LSF | Co$_2$FeO$_4$ | 10 | 11.1 | 0.93 | Yes | X |
| No. 40 | SSC | Co$_2$FeO$_4$ | 0.19 | 0.21 | 0.28 | Yes (minute) | ○ |
| No. 41 | SSC | Co$_2$FeO$_4$ | 0.30 | 0.33 | 0.35 | No | ⊚ |
| No. 42 | SSC | Co$_{1.5}$Fe$_{1.5}$O$_4$ | 2.3 | 2.5 | 0.27 | No | ⊚ |
| No. 43 | SSC | Co$_2$FeO$_4$ | 4.1 | 4.5 | 0.48 | No | ⊚ |
| No. 44 | SSC | Co$_2$FeO$_4$ | 9.5 | 10.6 | 0.85 | Yes | X |

As illustrated in Table 2, interface delamination was suppressed in those samples in which the occupied area ratio of the secondary phase in the first region was no more than 9.5% as a result of the fact that the content ratio of (Co, Fe)$_3$O$_4$ in the material of the first region was no more than 8.6 wt %. This feature is due to the fact that the film strength of the first region was enhanced by addition of (Co, Fe)$_3$O$_4$, and thereby an increase in the thermal expansion difference with the barrier layer resulting from addition of (Co, Fe)$_3$O$_4$ can be suppressed.

As illustrated in Table 2, micro interface delamination was also suppressed in those samples in which the occupied area ratio of the secondary phase of the first region was no more than 0.25% as a result of the fact that the content ratio of (Co, Fe)$_3$O$_4$ in the material of the first region was at least 0.23 wt %.. This is due to the fact that the film strength of the first region was sufficiently enhanced by maintaining the addition amount of (Co, Fe)$_3$O$_4$.

The cathode material of the present invention finds useful application in the field of fuel cells for the purpose of enhancing the durability of the cathode.

What is claimed is:

1. A cathode material containing (Co, Fe)$_3$O$_4$ and a perovskite type oxide, the perovskite type oxide being expressed by the general formula ABO$_3$ and including at least one of La and Sr at the A site, wherein:
    a content ratio of (Co, Fe)$_3$O$_4$ is at least 0.23 wt % and no more than 8.6 wt % with respect to a total weight of the cathode material, and
    a content ratio of the perovskite type oxide is 91.4 wt % or more with respect to the total weight of the cathode material.

2. The cathode material according to claim 1, wherein the perovskite type oxide is LSCF.

3. The cathode material according to claim 1, wherein the (Co, Fe)$_3$O$_4$ is at least one selected from the group consisting of CoFe$_2$O$_4$, Co$_{1.5}$Fe$_{1.5}$O$_4$ and Co$_2$FeO$_4$.

4. The cathode material according to claim 1, wherein the cathode consists essentially of the perovskite type oxide and (Co, Fe)$_3$O$_4$.

* * * * *